(12) United States Patent
Wood et al.

(10) Patent No.: US 10,682,740 B2
(45) Date of Patent: Jun. 16, 2020

(54) CLAMPING DEVICE AND METHOD

(71) Applicant: Utility Solutions, Inc., Hickory, NC (US)

(72) Inventors: Eugene H. Wood, Hickory, NC (US); Peter Shrilla, Hickory, NC (US)

(73) Assignee: UTILITY SOLUTIONS, INC., Hickory, NC (US)

( * ) Notice: Subject to any disclaimer, the term of this patent is extended or adjusted under 35 U.S.C. 154(b) by 281 days.

(21) Appl. No.: 15/593,875

(22) Filed: May 12, 2017

(65) Prior Publication Data

US 2018/0331520 A1 Nov. 15, 2018

(51) Int. Cl.
*H01R 43/00* (2006.01)
*B25B 5/02* (2006.01)
*H02G 1/02* (2006.01)

(52) U.S. Cl.
CPC *B25B 5/02* (2013.01); *H02G 1/02* (2013.01)

(58) Field of Classification Search
CPC ... B25B 5/02; H02G 1/02; H02G 1/06; H01H 31/00; Y10T 29/53222; Y10T 29/53226; Y10T 29/53235

USPC .................................. 29/745, 750, 758, 825
See application file for complete search history.

(56) References Cited

U.S. PATENT DOCUMENTS 4,825,513 A * 5/1989 Verespej ................. H02G 7/06
439/479
6,078,008 A * 6/2000 Wood ..................... H01H 31/00
174/138 R

* cited by examiner

*Primary Examiner* — Donghai D Nguyen
(74) *Attorney, Agent, or Firm* — Trego, Hines & Ladenheim, PLLC; Brandon Trego; Jonathan Hines

(57) ABSTRACT

A clamping device is disclosed. The clamping device includes a body having a first end and a second end; a first clamping portion secured to the first end of the body; and a second clamping portion operable to move in a bore of the body relative to the first clamping portion between an open position and a clamped position, the second clamping portion cooperating with the first clamping portion to clamp a cable between the first clamping portion and the second clamping portion.

22 Claims, 8 Drawing Sheets

CLAMPING DEVICE AND METHOD

BACKGROUND OF THE INVENTION

This invention relates generally to a clamping device, and more particularly to a clamping device for cables and/or electrical conductors.

For purposes of discussion, the invention will be described with reference to a clamping device for electrical conductors used in power transmission services to deliver electricity from a power producing facility to a residential or commercial property; however, it should be appreciated that the clamp may be used with any type of cable and/or conductor where clamping is required.

Overhead power transmission conductors are routinely used throughout the world to transmit electricity from power producing facilities to residential and/or commercial properties. Linemen who work for utility companies regularly perform maintenance on electrical conductors to ensure that the supply of electricity continues to flow with the least amount of interruption possible. Often times, such maintenance requires a lineman to string new electrical conductors, to cut the electrical conductors to allow slack in the conductor to be minimized, or to clamp two electrical conductors together using parallel groove and crimp connectors.

When stringing new conductors, a tail end (extra length of the conductor after termination) is often produced. If left uncontrolled, the tail end can pose a risk to the lineman until the tail end has been shortened and clamped. When making repairs, a lineman may be required to cut out a section of conductor and splice a new section into the conductor; however, such a repair requires the lineman to not only use cutters to cut the conductor but also maintain control of two sections of conductor along with the splice. Such repairs can create numerous risks to the lineman and, in some cases, result in a section of the conductor falling to the ground and/or being uncontrolled.

Accordingly, there remains a need for a clamping device that frees up a lineman's hands and allows the lineman to safely perform maintenance and repairs to conductors.

BRIEF SUMMARY OF THE INVENTION

This need is addressed by the present invention, which provides a clamping device for cables and/or electrical conductors.

According to one aspect of the invention, a clamping device includes a body having a first end and a second end; a first clamping portion secured to the first end of the body; and a second clamping portion operable to move in a bore of the body relative to the first clamping portion between an open position and a clamped position, the second clamping portion cooperating with the first clamping portion to clamp a cable between the first clamping portion and the second clamping portion.

According to another aspect of the invention, a clamping device includes a body having a first end, a second opposing end, and a bore extending therethrough from the first end to the second end; a first clamping portion secured to the first end of the body; and a clamping assembly operable for movement in the bore between an open position and a clamping position, the clamping assembly including a second clamping portion cooperating with the first clamping portion to clamp a cable therebetween. The second clamping portion includes a stem portion having an upper section and a lower section; and a top portion connected to the upper section of the stem portion, the stem portion having a width substantially smaller than a diameter of the top portion to receive the cable along a first side of the upper section and between the top portion and the first clamping portion.

According to another aspect of the invention, a method of repairing a cable includes the steps of providing a first clamping device according to claim 1; positioning a cable between the first clamping portion and the second clamping portion at a first location along the cable; moving the second clamping portion into the bore until the cable is clamped between the first clamping section and the second clamping section; providing a second clamping device according to claim 1; positioning the cable between the first and second clamping portions of the second clamping device at a second location along the cable spaced from the first location; moving the second clamping portion of the second clamping device into the bore until the cable is clamped between the first and second clamping sections of the second clamping device; connecting the first clamping device to the second clamping device; and cutting the cable between the first and second clamping devices and performing a repair.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
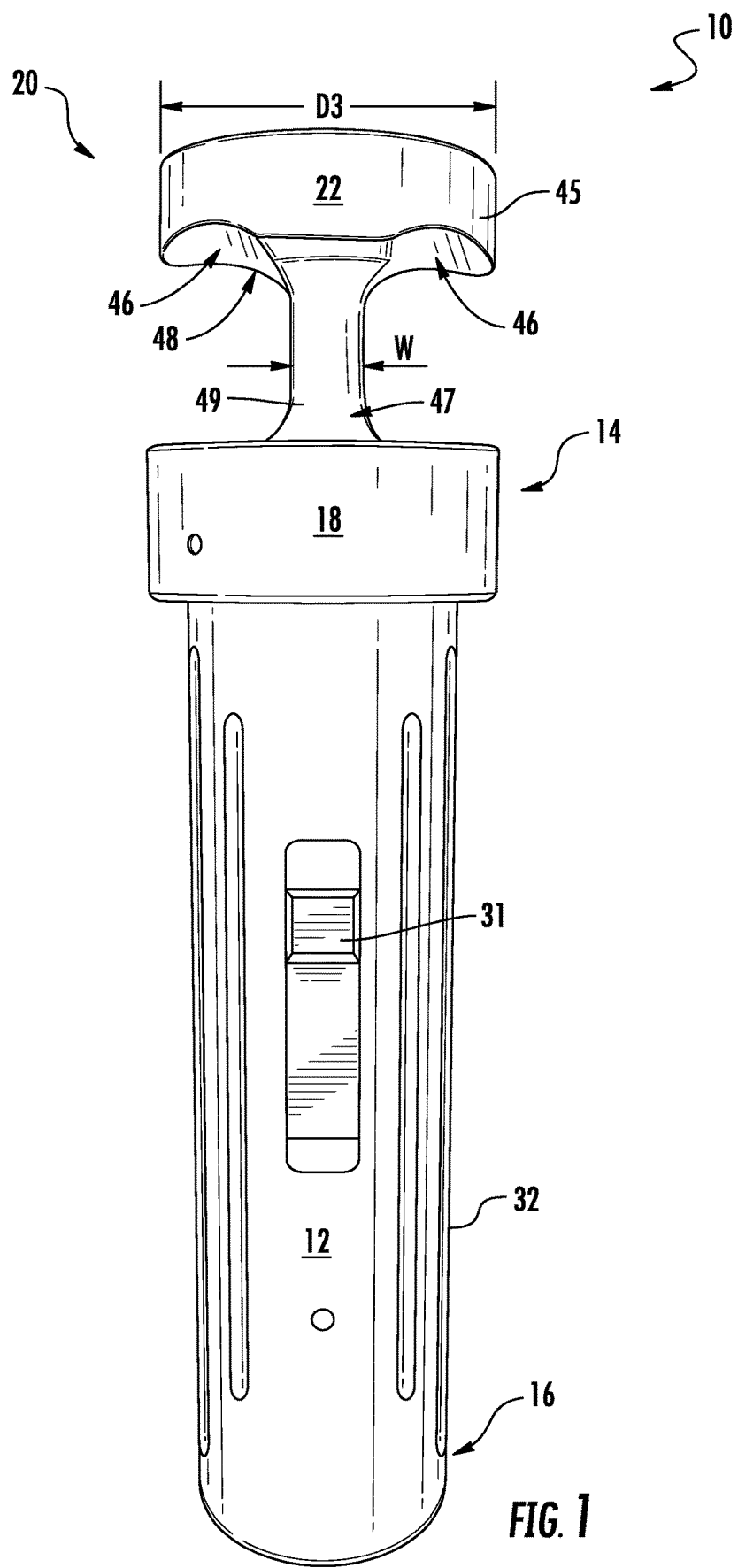
FIG. 1 shows clamping device.

Referring to the drawings wherein identical reference numerals denote the same elements throughout the various views, FIGS. 1-4 illustrate an exemplary clamping device 10 for clamping onto cables and/or electrical conductors. The clamping device 10 includes a body 12 having first and second ends 14 and 16, a first clamping portion 18 disposed on the first end 14, a clamp assembly 20 having a second clamping portion 22 connected to a first end 24 of a rod 26 and a connector 28 connected to a second end 30 of the rod 26, and a trigger 31 configured for engagement with the rod 26.

The body 12 is made of a non-conductive insulating material and includes an outer wall 32 having a first diameter "D1" that defines a bore 34 extending from the first end 14 to the second end 16 to allow the clamp assembly 20 to move therein. As illustrated, the bore 34 has varying diameters; however, it should be appreciated that a single diameter bore may be formed. The first end 14 of the body 12 includes a groove 36 formed in and around a periphery of the wall 32. As shown, the groove 36 has a diameter "D2" and is positioned inward of a distal end 38 of the first end 14 to create two separate wall sections having a diameter D1; thus, creating a mechanical retaining means.

The first clamping portion 18 is retained on the first end 14 by one or more projections 40 such as a pin, set screw, etc. extending through the first clamping portion 18 and into the groove 36. The first clamping portion 18 includes a wall 42 defining a bore 44 having a diameter slightly larger than the diameter of the wall 32 to allow the first clamping portion 18 to slide over the first end 14 of the body 12 and be retained thereon. With the first clamping portion 18 positioned over the first end 14, the projections 40 are moved into the groove 32 to rotatably secure the first clamping portion 18 on the first end 14 while allowing the first clamping portion 18 to rotate thereabout. Such securing arrangement allows the first clamping portion to remain in solid contact with cable "C" when the body 12 is rotated to permit tightening of the clamping device 10 onto the cable "C". It should be appreciated that the first clamping portion 18 may be secured to the first end 14 in a manner that prohibits rotation.

Figure 2:
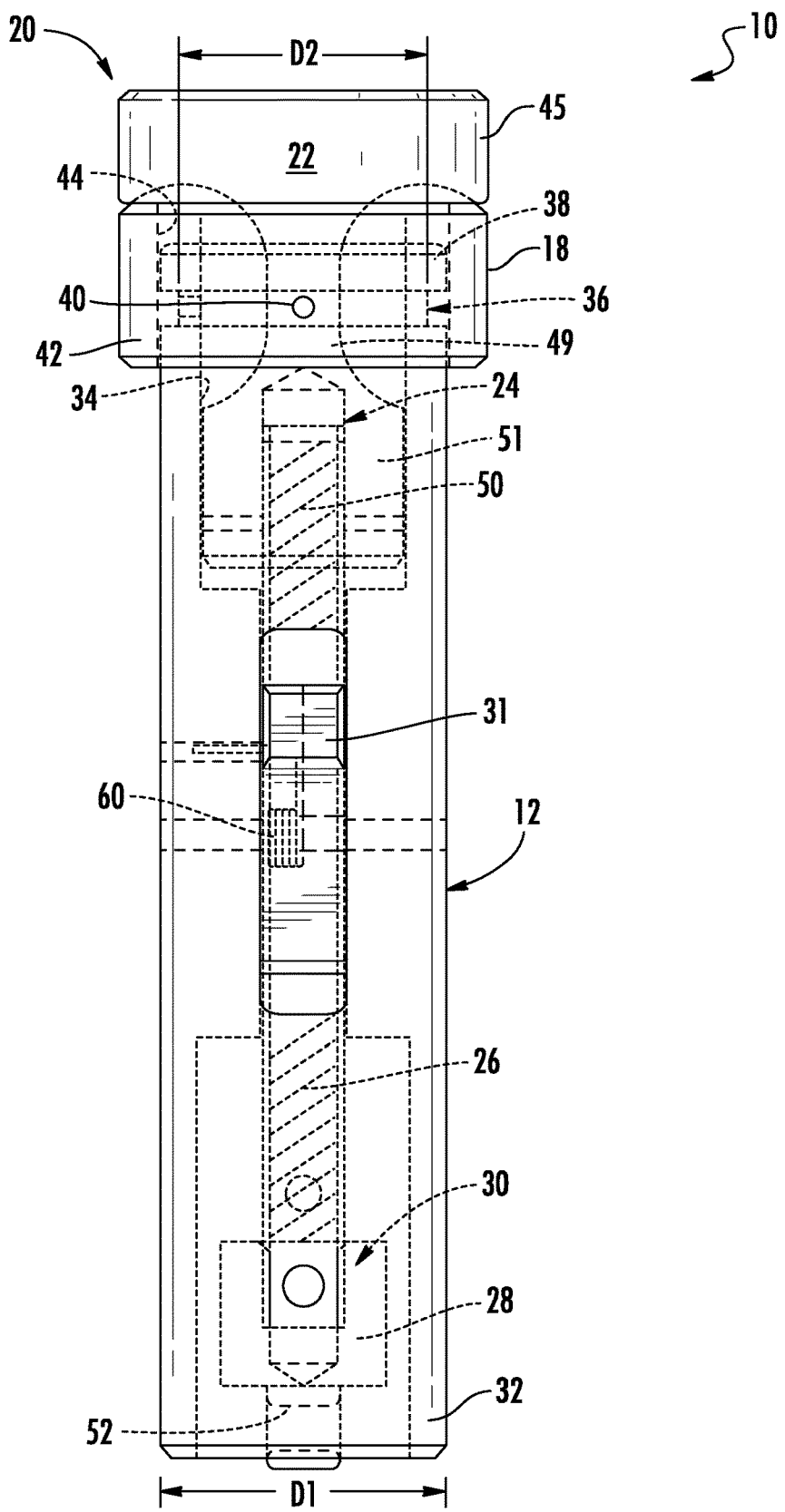
FIG. 2 shows internals of the clamping device of FIG. 1.
Figure 3:
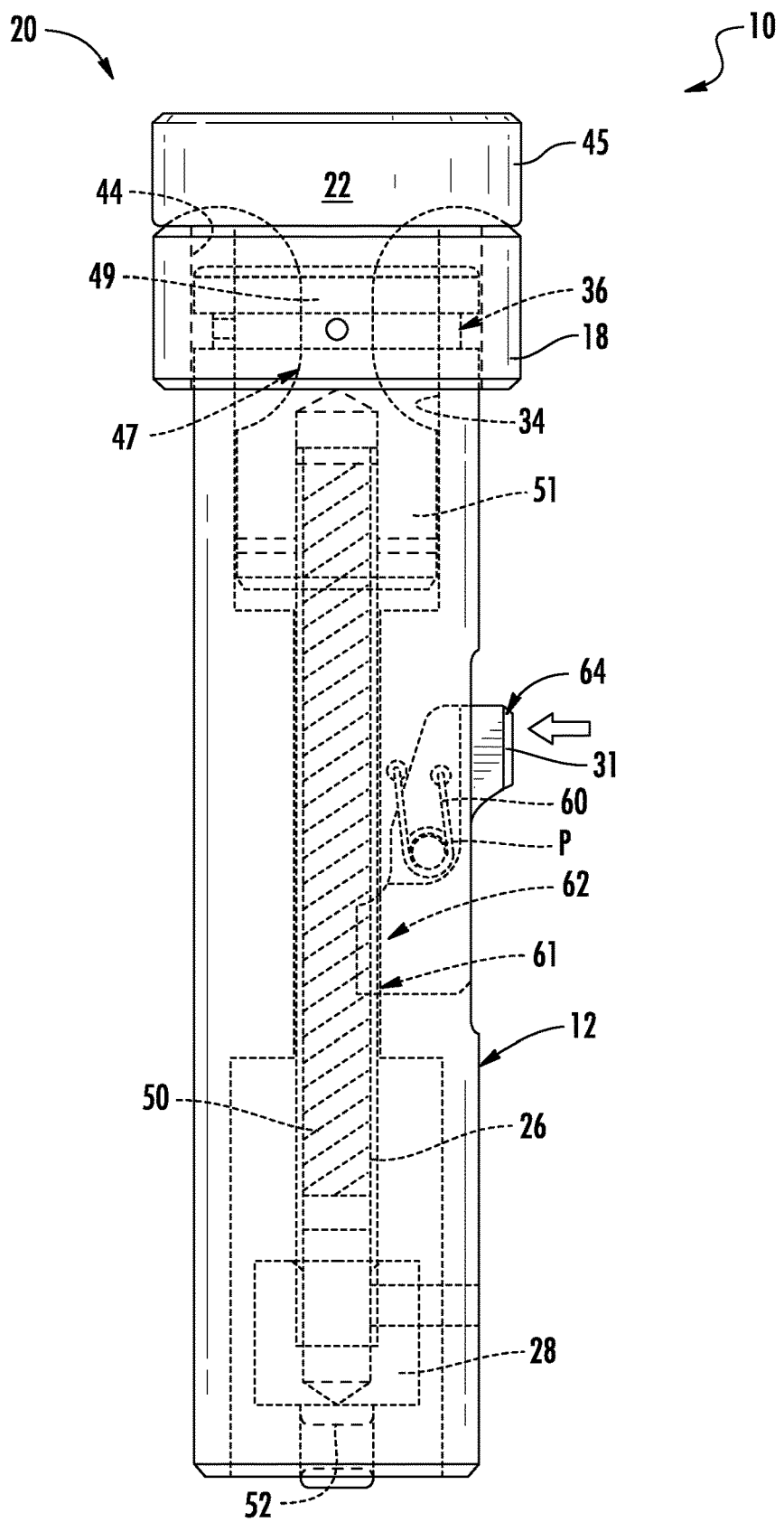
FIG. 3 shows internals of the clamping device of FIG. 1.
Figure 4:
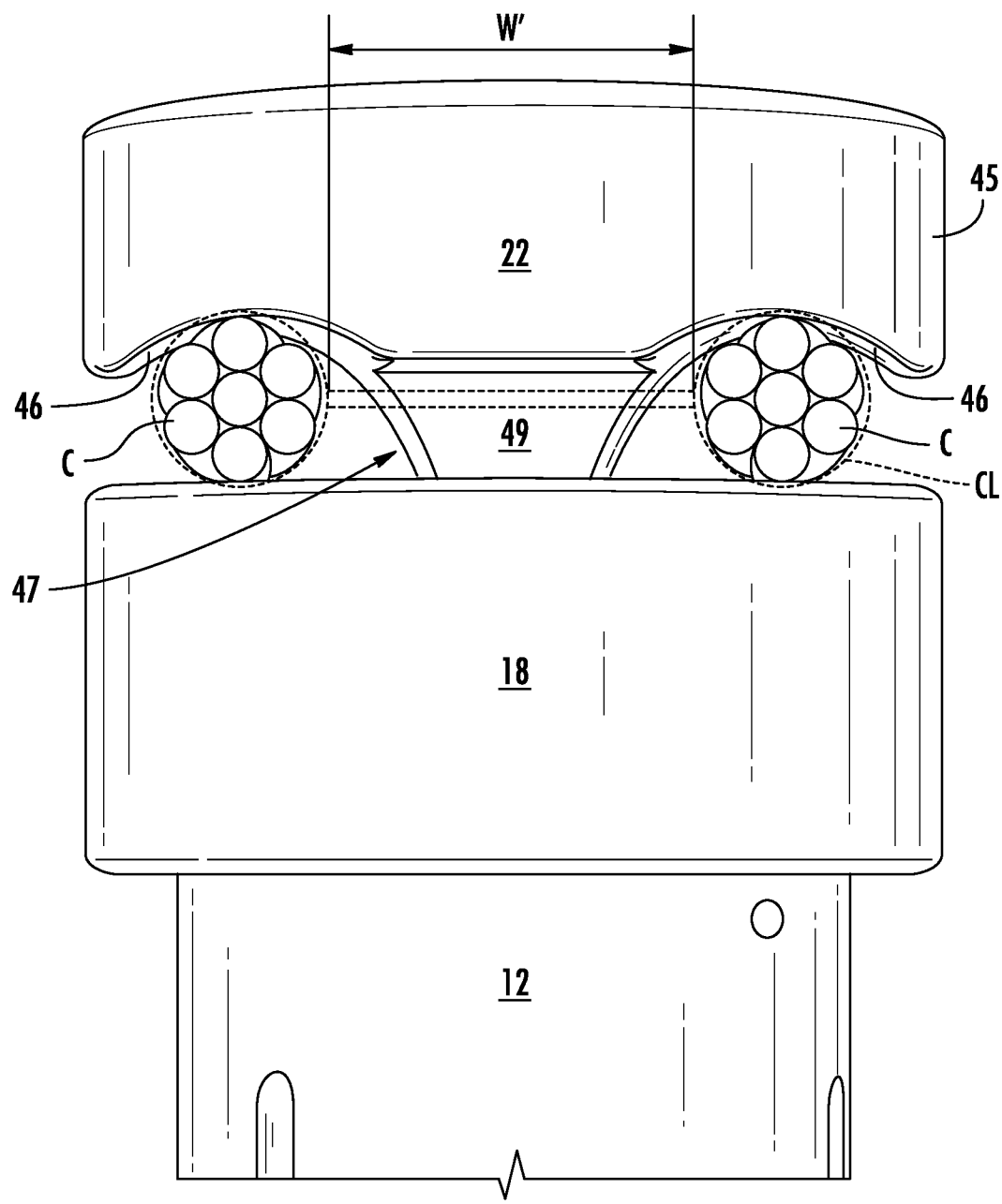
FIG. 4 shows two conductors being secured in the clamping device of FIG. 1.

The clamp assembly 20 is configured to move in and out of the bore 34 to allow the second clamping portion 22 to move relative to the first clamping portion 18 between an open position, FIG. 1, so that a cable and/or conductor may be received and a closed or clamped position, FIGS. 2-4, where the cable and/or conductor is clamped therebetween. For purposes of simplicity, the term "cable" will be used throughout this specification to refer to any cable, electrical conductor, or arcuate object to be clamped by the clamping device 10.

The second clamping portion 22 includes a top portion 45 integrally-formed with a stem portion 47. It should be appreciated that the top portion 45 may also be connected to the stem portion 47 using a fastener or other suitable connection device. The stem portion 47 includes an upper section 49 that is connected to the top portion 45 and a lower section 51 that is connected to the rod 26. The upper section 49 has a width "W" substantially smaller than a diameter "D3" of the top portion 45 and is connected to a bottom 48 of the top portion 45 between two concave recesses 46 positioned along the bottom 48 to permit cables to be clamped between the top portion 45 and the first clamping portion 18. As shown in FIG. 4, the recesses 46 are shaped to accommodate and provide a gripping force around arcuate objects such as cables "C".

By having the width "W" of the upper section 49 of the stem portion 47 smaller than the diameter "D3" of the top portion 45, the clamping device 10 can accommodate two cables "C" at one time, FIG. 4. In addition, the width "W" of the upper section is configured to provide proper spacing between the two cables "C" clamped in the clamping device 10 to allow parallel groove clamps or crimp on connections "CL" having a width "W" substantially equal to or slightly larger than the width "W" to be installed and secured on the two cables "C". As shown, a cable "C" is placed on opposite sides of the upper section 49 of the stem portion 47, positioned in the recesses 46, and clamped between the top portion 45 and the first clamping portion 18.

As stated above, the second clamping portion 22 is connected to the first end 24 of the rod 26. The rod 26 is threaded (i.e. has threads 50) to allow small up and down adjustments of the second clamping portion 22 relative to the first clamping portion 18 by rotating the body 12. The threads 50 also engage the trigger 31 to prevent sliding of the rod 26 relative to the trigger 31, thereby preventing the second clamping portion 22 from moving out of engagement (to the open position) with a cable clamped between the first and second clamping portions 18, 22. To be clear, when the trigger 31 is engaged with the threads 50 of the rod 26, the second clamping portion 22 may be moved into engagement (to the closed position) with the cable and may be adjusted by rotation of the body 12, but movement out of engagement with the cable is prevented. Further, by depressing the trigger 31, the trigger disengages the threads 50 of the rod 26 to allow the clamping assembly 20 to freely move within in the bore 34, thereby moving the second clamping portion 22 with respect to the first clamping portion 18.

The trigger 31 pivots about point "P" between an engaged position, FIG. 3, where the trigger 31 prevents the second clamping portion 22 from moving out of engagement (from closed to open position) with the first clamping portion and a non-engaged position where the trigger 31 allows the rod 26 to move freely in the bore 34 between the open and closed positions, thereby allowing the second clamping portion 18 to move freely with respect to the first clamping portion 18. The trigger 31 includes a spring 60 to bias the trigger into the engaged position, an engagement section 62, and a release section 64. The engagement section 62 has a concave shape to match the outer perimeter of the rod 26 to ensure proper engagement between the engagement section 62 and the rod 26 and a lip or tang 61 to engage the threads 50.

Depressing the release section 64 causes the trigger 31 to rotate about point "P" to disengage the engagement section 62 from engagement with the threads 50 of the rod 26, thereby allowing the second clamping portion 22 to move freely relative to the first clamping portion 18. When the release section 64 is not depressed, the spring 60 biases the trigger 31 into the engaged position by forcing the tang 61 of the engagement section 62 into engagement with the threads 50 of the rod 26, FIG. 3, thereby preventing the second clamping portion 22 from moving to the open position.

Figure 5:
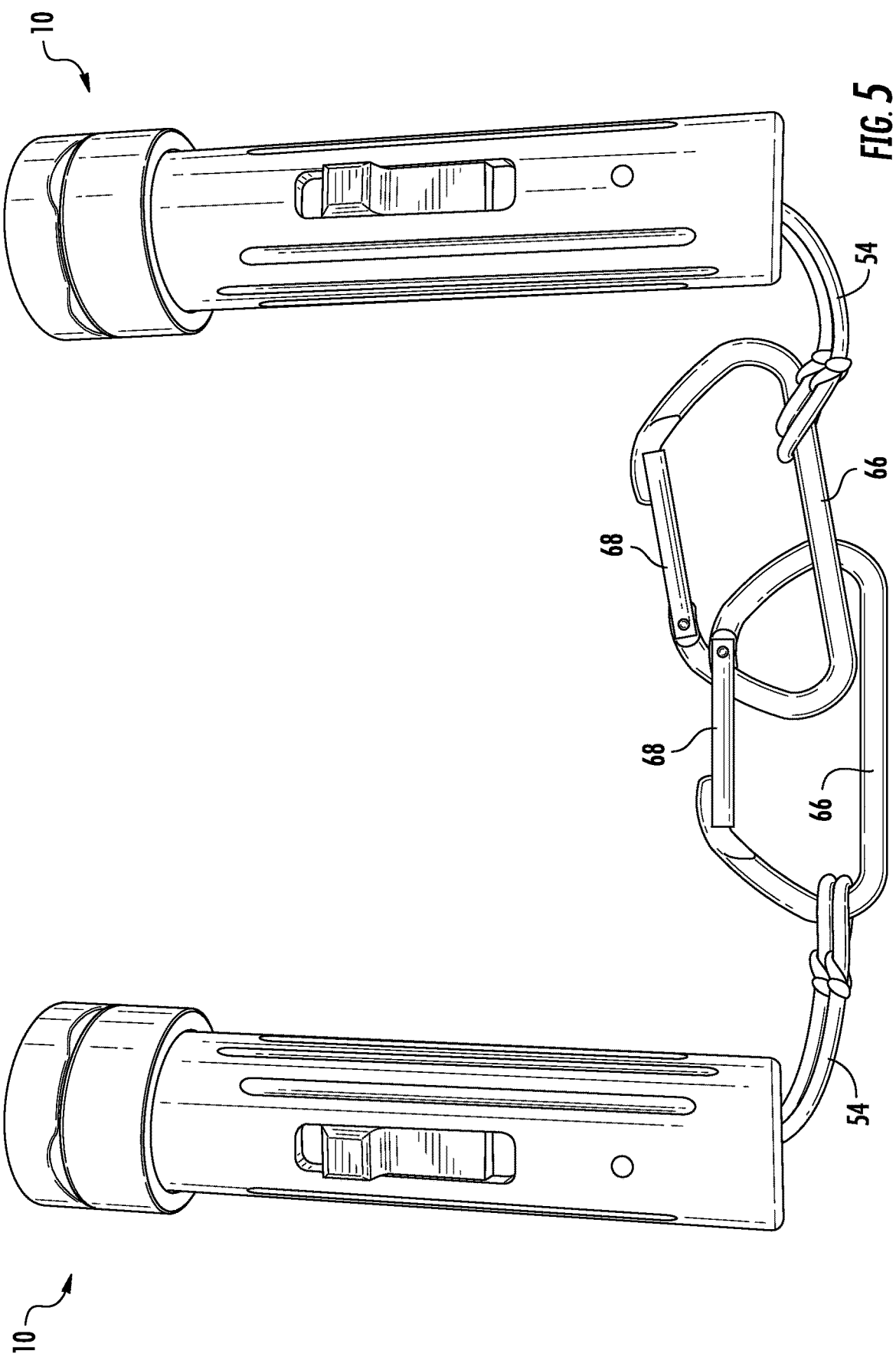
FIG. 5 illustrates a pair of clamping devices of FIG. 1 connected together.

Connector 28 is connected to the second end 30 of the rod 26 and provides a connection point for a rope, cable, or other suitable lanyard 54 (FIG. 5). The connector 28 includes an aperture 52 extending therethrough that allows the lanyard 54 to be secured to the connector 28. As shown in FIG. 5, the connector 28 allows multiple clamping devices 10 to be connected together using the lanyards 54 which are connected together by connectors such as carabiners 66, thereby connecting the clamping devices 10 together. As illustrated, the carabiners 66 have a spring biased gate 68 that permits the lanyards 54 to be received easily and quickly by the carabiners 66 while preventing the lanyards 54 from being removed from the carabiners 66 without an individual actively pushing the gate 68 inward and sliding the lanyard 54 out of engagement with the carabiner 66.

Figure 6:
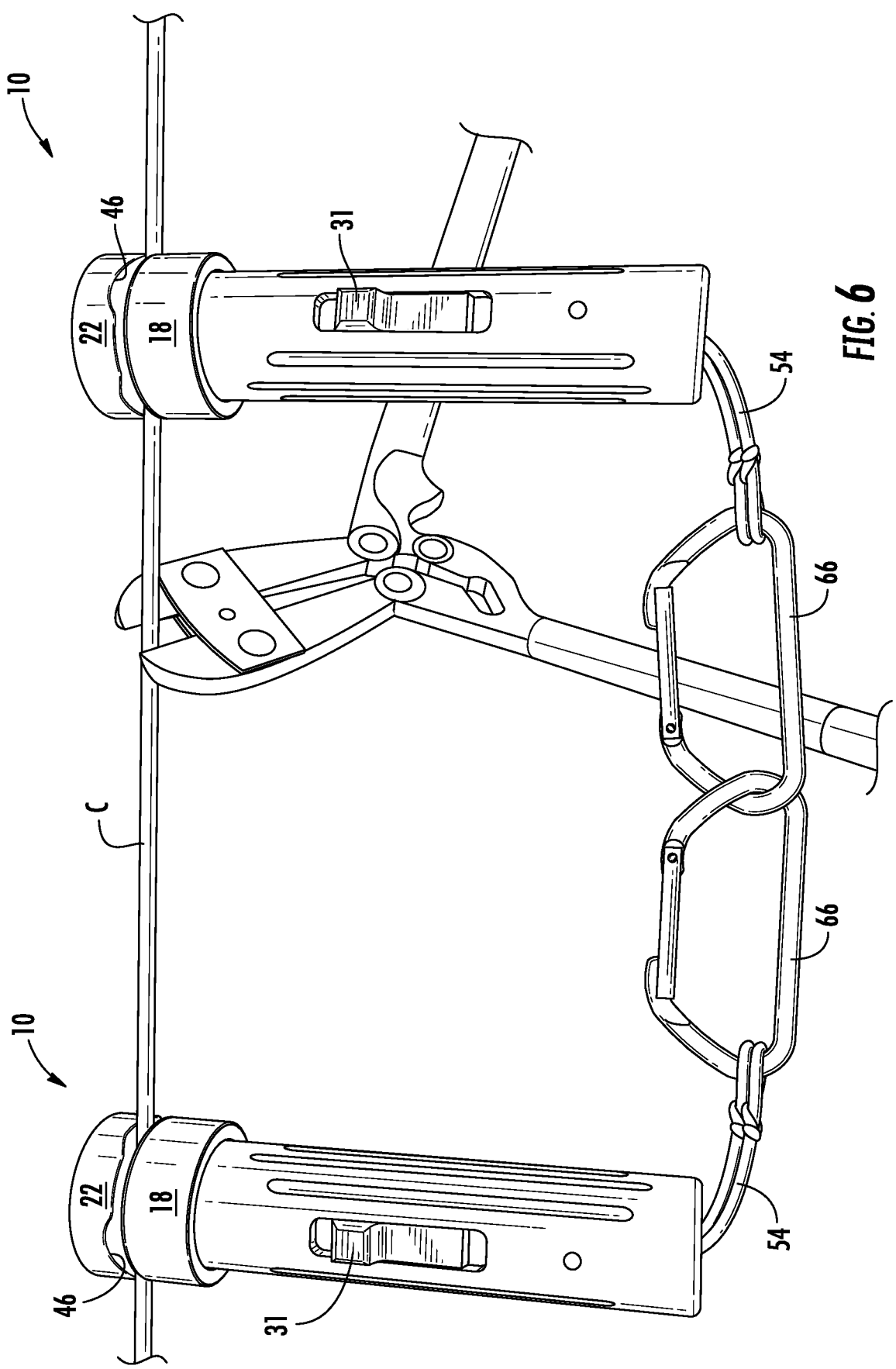
FIG. 6 shows the clamping devices of FIG. 5 clamped on a conductor in a spaced-apart relation to allow the conductor to be cut between the clamping devices.
Figure 7:
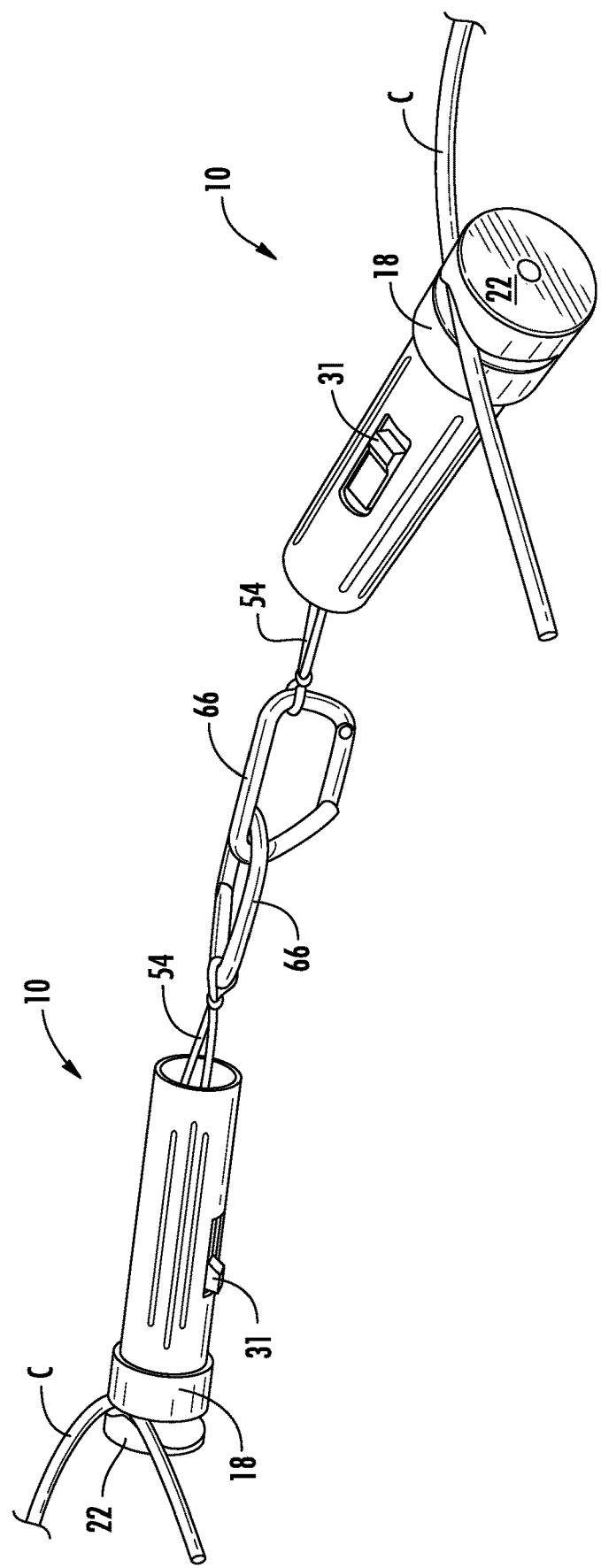
FIG. 7 shows the clamping devices of FIG. 5 holding sections of the conductor after being cut in FIG. 6.
Figure 8:
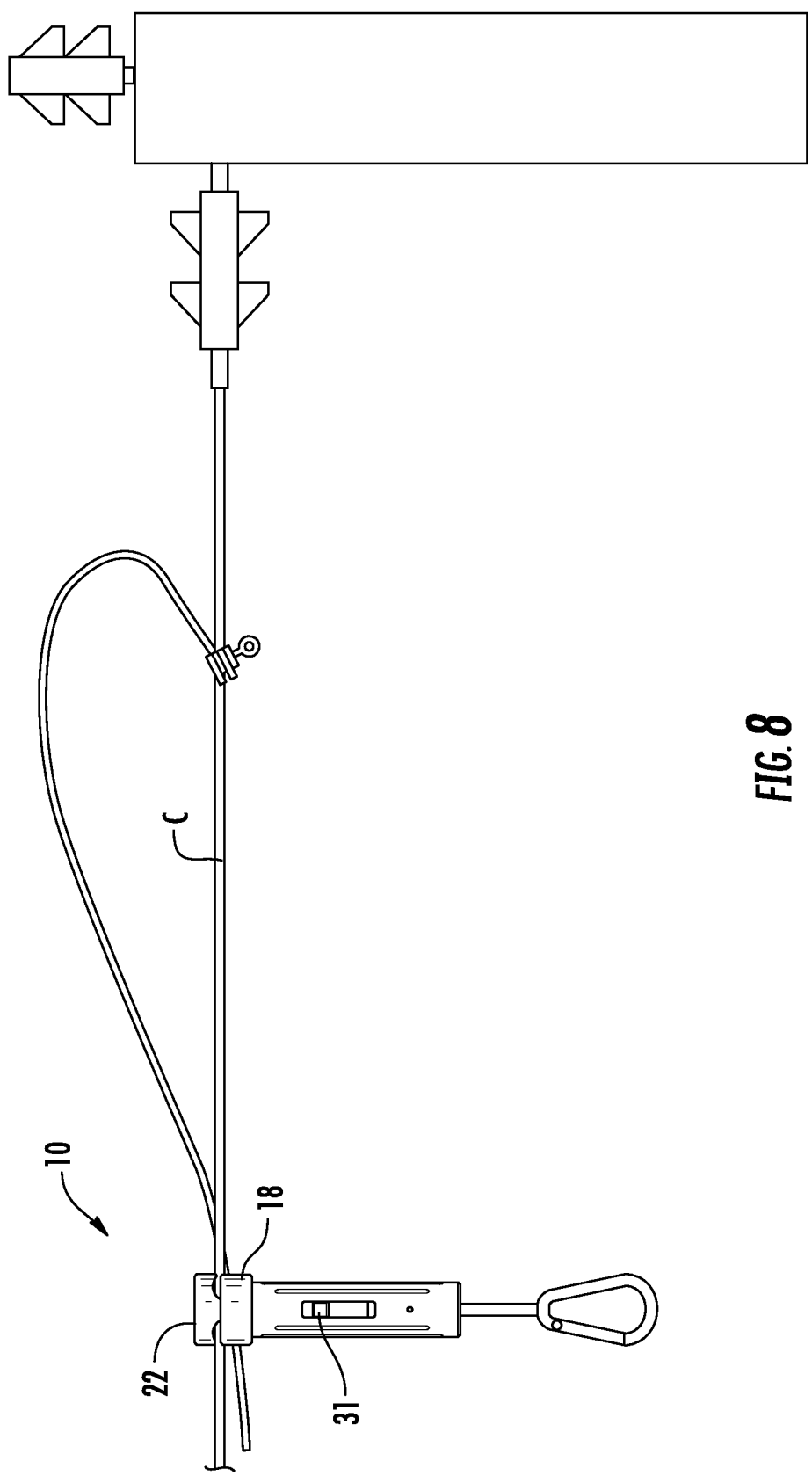
FIG. 8 shows the clamping device of FIG. 1 securing a tail-end of a conductor.

Referring to FIGS. 6-8, in use, the clamping device 10 is used to secure cables while a lineman or other worker performs maintenance on the cables. As shown in FIGS. 6 and 7, two clamping devices 10 may be linked together using the lanyards 54 and carabiners 66 to allow a worker to cut a cable "C" while maintaining control of the cable. In this example, a worker would attach a first one of the clamping devices 10 to a first section of a cable and attach a second one of the clamping devices 10 to a second section of the cable to allow the worker to cut the cable at a location between the two clamping devices 10.

As shown, the user attaches a first one of the clamping devices 10 by depressing the trigger 31 to release the tang 61 of the engagement section 62 from engagement with the threads 50 of the rod 26 and pulling the second clamping portion 22 out of the bore 34 and into the open position, FIG. 1. It should be appreciated that if the clamping device 10 is already in the open position, the above step is not needed. Once the second clamping portion 22 has been moved to the open position, the trigger 31 is released to allow the tang 61 of the engagement section 62 to engage the threads 50.

The cable "C" is then positioned between the first clamping portion 18 and the second clamping portion 22 such that the recess 46 cooperates with the cable "C". Once the cable "C" is positioned between the first and second clamping portions 18, 22, the user moves the second clamping portion 22 into the bore 34 until the cable "C" is clamped between the first and second clamping portions 18, 22, see FIG. 4 for clamping detail. Moving the second clamping portion 22 into the bore 34 may be done by depressing the trigger 31 or by simply pushing the second clamping portion 22 into the bore 34. It should be understood that the tang 61 does not prevent a user from pushing the second clamping portion 22 into the bore 34; rather, it only prevents the second clamping portion 22 from being pulled out of the bore 34. The user can then rotate the body 12 in a first direction (clockwise or counterclockwise depending on the threads 50 of the rod 26) to tighten the second clamping portion 22 down against the cable "C" and provide additional clamping force or in a second direction (opposite of the first direction) to release clamping force on the cable "C" to allow the user to reposition the clamping device 10 along the cable "C" without completely uncoupling the device 10 from the cable "C". Rotation of the body 12 causes the clamp assembly 20 to move linearly with respect to the trigger 31. Linear movement of the clamp assembly 20 per revolution of the body 12 is determined by the thread pitch of the threads 50 and provides a "micro-adjust" feature.

Once the first one of the clamping devices 10 is attached to the cable "C", a second one of the clamping devices 10 is attached to the cable "C" at a location along the cable "C" spaced from the first one of the clamping devices 10. The first and second ones of clamping devices 10 are then connected to each other using the lanyards 54 and carabiners 66. It should be appreciated that the first and second ones of the clamping devices 10 may also be connected together by the lanyards 54 and carabiners 66 prior to attaching the first one of the clamping devices 10 to the cable "C" or after attaching the first one of the clamping devices 10 and prior to attaching the second one of the clamping devices 10.

With the first and second ones of the clamping devices 10 attached to the cable "C", the worker then cuts the cable "C", FIG. 6, thereby separating the cable "C" into two sections which are held and/or connected by the first and second clamping devices 10 to allow the worker to make a repair thereto, FIG. 7. Once the repair is made, the worker depresses the trigger 31 for each of the clamping devices 10 to release the clamping devices 10 from the cable "C".

Referring to FIG. 8 a single clamping device 10 may be used to secure a tail of the cable 10 or two separate cables "C" together. As shown, the clamping device 10 secures two sections of the cable between the first and second clamping portions 18, 22 like that shown in FIG. 4. The clamping device 10 is attached to the two sections of cable "C" in the same manner as discussed above, except two cables "C" are positioned between the first and second clamping portions 18, 22. As shown in FIG. 4 the cables "C" are positioned on opposing sides of the upper section 49 of the stem portion 47. The spacing between the cables "C" is dictated by the width "W", which creates spacing between recesses 46, to provide correct spacing for a user to easily install parallel groove clamps or crimp on connections "CL" having a width "W" substantially equal to or slightly larger than the width "W".

The foregoing has described a clamping device and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A clamping device, comprising:
   (a) a body having a first end and a second end;
   (b) a first clamping portion secured to the first end of the body; and
   (c) a second clamping portion operable to move in a bore of the body relative to the first clamping portion between an open position and a clamped position, the second clamping portion cooperating with the first clamping portion to clamp a cable between the first clamping portion and the second clamping portion, the second clamping portion being connected to a threaded rod, the threaded rod extending into the bore and cooperating with a trigger connected to the body, wherein the trigger engages the threaded rod to prevent the second clamping portion from moving from the clamped position to the open position.

2. The clamping device according to claim 1, wherein the body is made of a non-conductive insulating material.

3. The clamping device according to claim 1, wherein the first clamping portion is rotatably secured to the first end of the body to allow the first clamping portion to rotate with respect to the body.

4. The clamping device according to claim 1, wherein the second clamping portion includes:
   (a) a stem portion having an upper section and a lower section; and
   (b) a top portion connected to the upper section of the stem portion, the stem portion having a width substantially smaller than a diameter of the top portion to receive a cable along a first side of the upper section and between the top portion and the first clamping portion.

5. The clamping device according to claim 4, wherein the stem portion is connected to the top portion at about a center of the top portion to permit a first cable to be received on the first side of the upper section and a second cable to be received on an opposing second side of the upper section of the stem portion, thereby permitting two cables to be clamped between the top portion and the first clamping portion.

6. A method of using the clamping device of claim 1, comprising the steps of:
   (a) positioning a first cable section between the first clamping portion and the second clamping portion; and
   (b) moving the second clamping portion into the bore until the first cable section is clamped between the first clamping section and the second clamping section.

7. The method according to claim 6, further including the step of positioning a second cable section between the first clamping portion and the second clamping portion prior to moving the second clamping portion into the bore.

8. The method according to claim 7, wherein the first and second cable sections are from a single cable, the method further including the steps of:
   securing a clamp on the first and second cable sections; and
   removing the clamping device from the first and second cable sections.

9. The method according to claim 7, further including the step of positioning the first cable section on a first side of a stem portion of the second clamping portion and positioning the second cable section on a second side of the stem portion to create a space between the first and second cable sections, the stem portion having a pre-determined width substantially equal to a width of a clamp to be installed on the first and second cable sections.

10. The method according to claim 9, further including the steps of:
    installing the clamp on the first and second cable sections; and
    removing the clamping device from the first and second cable sections.

11. The method according to claim 6, further including the step of rotating the body in a first direction to tighten the second clamping portion down onto the cable.

12. The method according to claim 6, further including the step of releasing the first cable section by depressing a trigger pivotally connected to the body to allow the second clamping portion to be moved out of the bore, thereby allowing the cable to be removed from the clamping device.

13. The method according to claim 11, further including the step of rotating the body in a second direction to loosen the second clamping portion from the cable.

14. A method of repairing a cable, comprising the steps of:
   (a) providing a first clamping device according to claim 1;
   (b) positioning a cable between the first clamping portion and the second clamping portion at a first location along the cable;
   (c) moving the second clamping portion into the bore until the cable is clamped between the first clamping section and the second clamping section;
   (d) providing a second clamping device according to claim 1;
   (e) positioning the cable between the first and second clamping portions of the second clamping device at a second location along the cable spaced from the first location;
   (f) moving the second clamping portion of the second clamping device into the bore until the cable is clamped between the first and second clamping sections of the second clamping device;
   (g) connecting the first clamping device to the second clamping device; and
   (h) cutting the cable between the first and second clamping devices and performing a repair.

15. The method according to claim 14, wherein after performing the repair, further including the steps depressing a trigger on the first clamping device to release the cable therefrom and depressing a trigger on the second clamping device to release the cable therefrom.

16. The method according to claim 14, further including the steps of rotating the body of the first and second clamping devices to increase or decrease a clamping force on the cable.

17. A clamping device, comprising:
   (a) a body having a first end, a second opposing end, and a bore extending therethrough from the first end to the second end;
   (b) a first clamping portion secured to the first end of the body; and
   (c) a clamping assembly operable for movement in the bore between an open position and a clamping position, the clamping assembly including a second clamping portion cooperating with the first clamping portion to clamp a cable therebetween, a threaded rod, and a trigger connected to the body, the second clamping portion having:
      (i) a stem portion having an upper section and a lower section; and
      (ii) a top portion connected to the upper section of the stem portion, the stem portion having a width substantially smaller than a diameter of the top portion to receive the cable along a first side of the upper section and between the top portion and the first clamping portion; and
   (d) wherein the threaded rod is connected to the lower section of the stem portion, the threaded rod extending into the bore and cooperating with the trigger, wherein the trigger engages the threaded rod to prevent the clamping assembly from moving from the clamping position to the open position.

18. The clamping device according to claim 17, wherein the threaded rod includes first and second ends, the first end being connected to the lower section of the stem portion, and wherein the trigger is moveable between an engaged position and a non-engaged position, the trigger engaging the rod in the engaged position to prevent the second clamping portion from being pulled from the clamping position to the open position.

19. The clamping device according to claim 18, wherein the trigger is pivotally connected to the body and includes:
   (a) an engagement section having a tang configured to engage threads of the rod in the engagement position;
   (b) a release section configured to permit a user to move the trigger to the non-engaged position; and
   (c) a spring to bias the trigger in the engaged position.

20. The clamping device according to claim 18, further including:
   (a) a connector connected to the second end of the rod, the connector including an aperture extending therethrough;
   (b) a lanyard connected to the aperture; and
   (c) a carabiner connected to the lanyard.

21. The clamping device according to claim 17, wherein the stem portion is connected to the top portion at about a center of the top portion to permit a first cable to be received on the first side of the upper section and a second cable to be received on an opposing second side of the upper section of the stem portion, thereby permitting two cables to be clamped between the top portion and the first clamping portion.

22. The clamping device according to claim 17, wherein the top portion includes a first concave recess positioned on a first side of the upper section and a second concave recess positioned on a second side of the upper section, the first and second recesses being configured to provide a gripping force about an arcuate object.

* * * * *